United States Patent
Arai et al.

[11] Patent Number: 5,785,793
[45] Date of Patent: Jul. 28, 1998

[54] PROCESS AND DEVICE FOR BONDING DISCS TO ONE ANOTHER

[75] Inventors: Tetsuji Arai, Yokohama; Shouei Ebisawa, Kounosu; Toshio Yokota, Ebina, all of Japan

[73] Assignees: Ushiodenki Kabushiki Kaisha; Dainippon Ink and Chemicals, Incorporated, both of Tokyo, Japan

[21] Appl. No.: 866,072

[22] Filed: May 30, 1997

[30] Foreign Application Priority Data

May 31, 1996 [JP] Japan ................................. 8-159257
Jun. 28, 1996 [JP] Japan ................................. 8-169055

[51] Int. Cl.$^6$ ................................. B32B 31/28
[52] U.S. Cl. ................................. 156/272.2; 156/275.7; 156/379.6; 156/379.8; 156/498
[58] Field of Search ................................. 156/272.2, 275.5, 156/275.7, 379.6, 379.8, 498; 369/100, 284, 285

[56] References Cited

U.S. PATENT DOCUMENTS

| | | | |
|---|---|---|---|
| 4,877,475 | 10/1989 | Uchida et al. | 156/275.7 |
| 5,416,127 | 5/1995 | Chandran et al. | 522/149 |
| 5,684,778 | 11/1997 | Yamada et al. | 369/100 |

*Primary Examiner*—Michael W. Ball
*Assistant Examiner*—Michael A. Tolin
*Attorney, Agent, or Firm*—Sixbey, Friedman, Leedom & Ferguson; David S. Safran

[57] ABSTRACT

To cement UV radiation-transmitting substrates to one another without deformation and within a short time, and to cement them together with high efficiency without an aluminum film of an information recording layer melting, according to the invention, a device for bonding discs to one another is provided having a radiant light source which irradiates the discs with radiant light which contains ultraviolet radiation at least once in a flash; a wavelength selector which is placed in the optical path between the radiant light source and the discs at a distance from the discs, which transmits the ultraviolet rays and absorbs light in a range of wavelengths which are absorbed by the UV radiation-transmitting substrates of the discs; a cooling device which admits and discharges cooling air between the radiant light source and the wavelength selector.

5 Claims, 8 Drawing Sheets

FIG. 4a
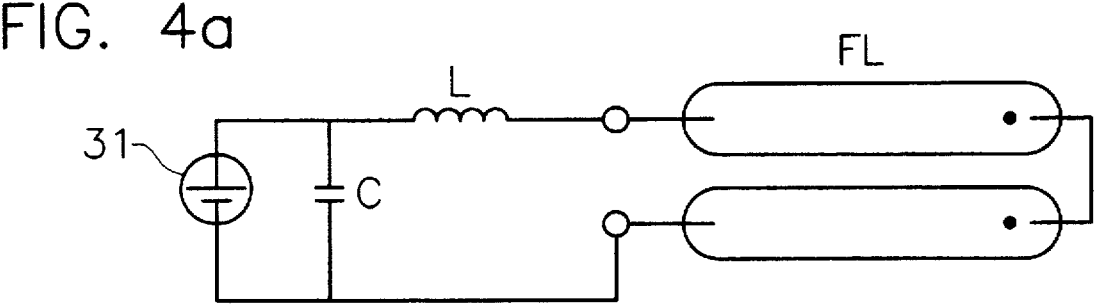
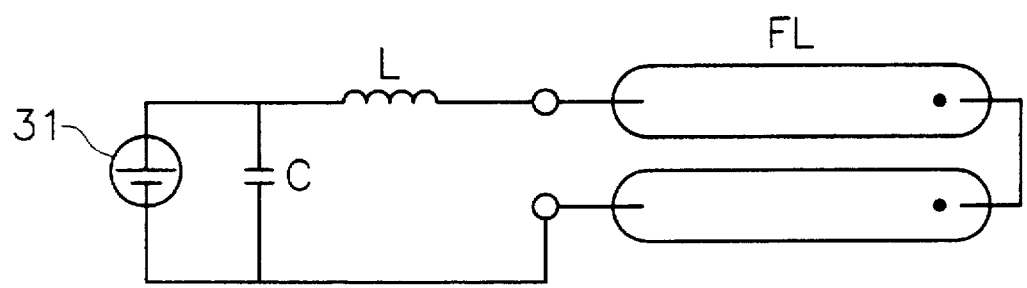
FIG. 4b
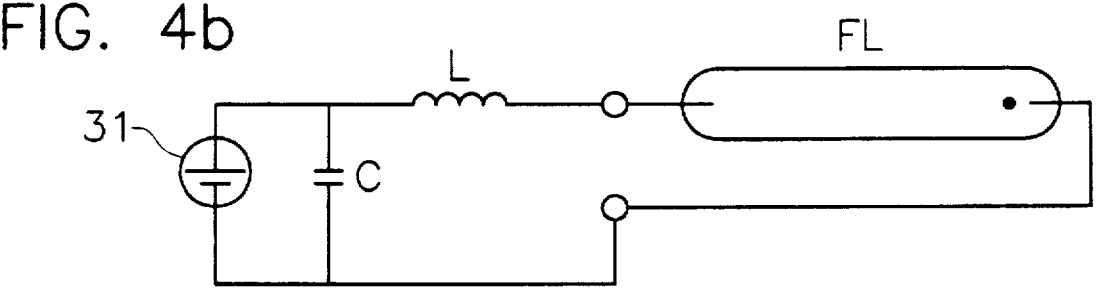
FIG. 4c
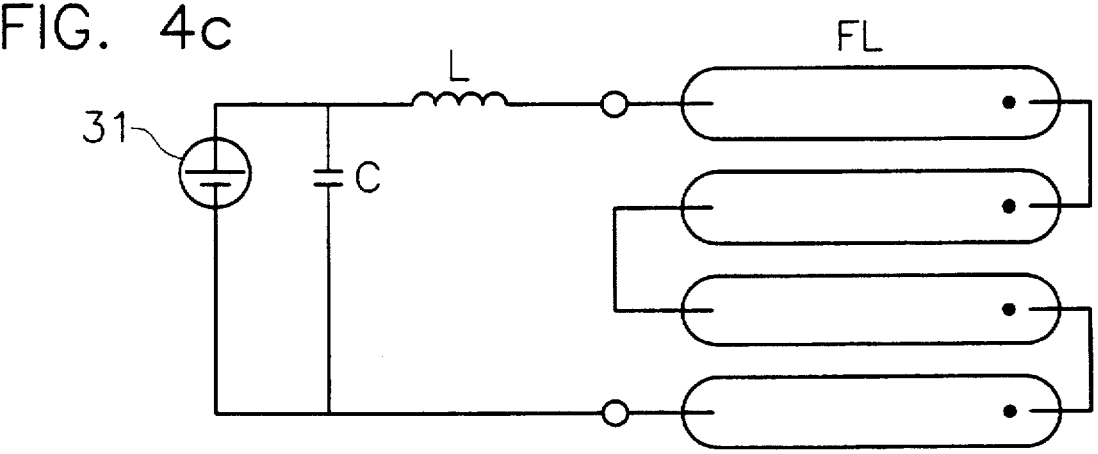

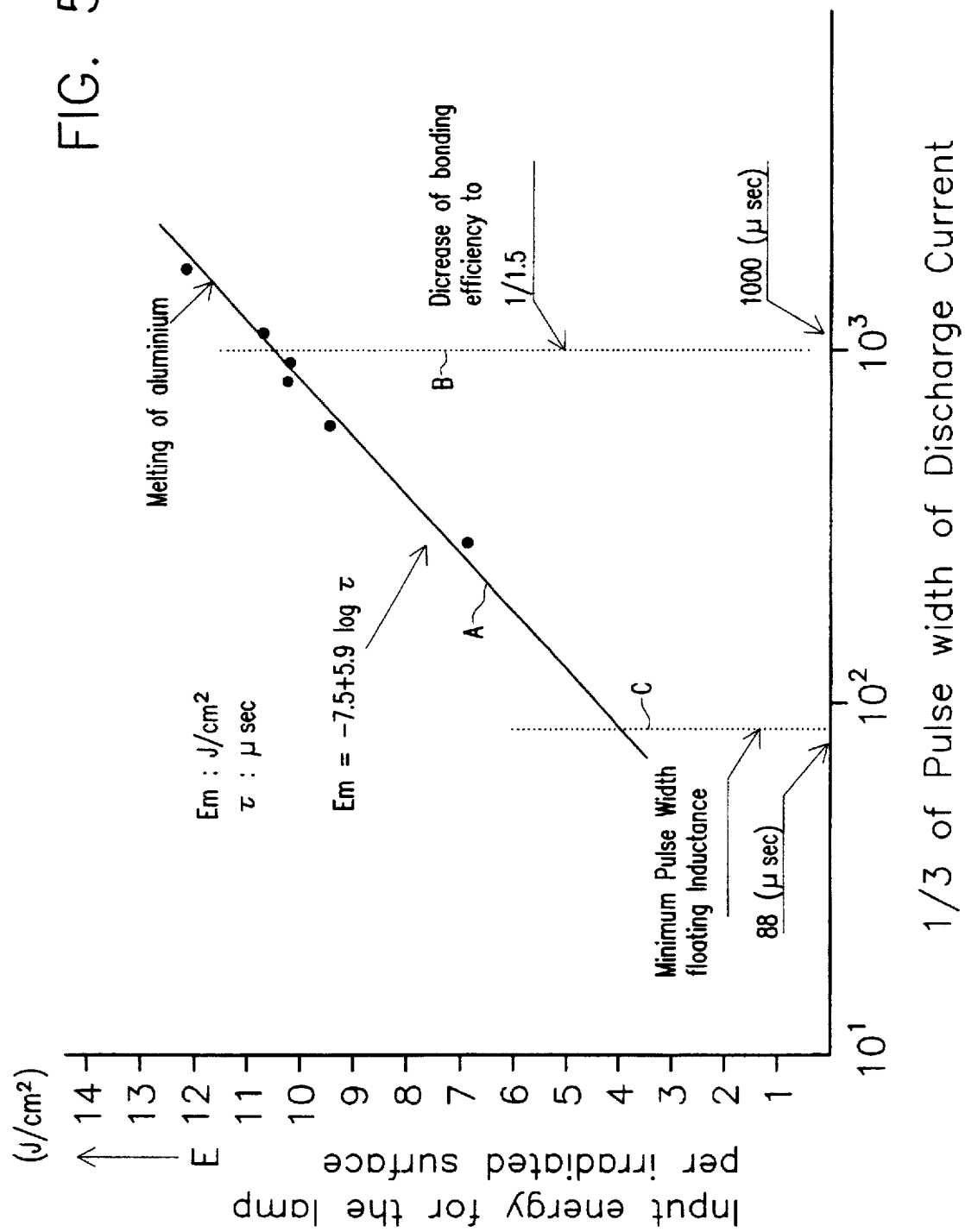

FIG. 9(a) DVD-1.0
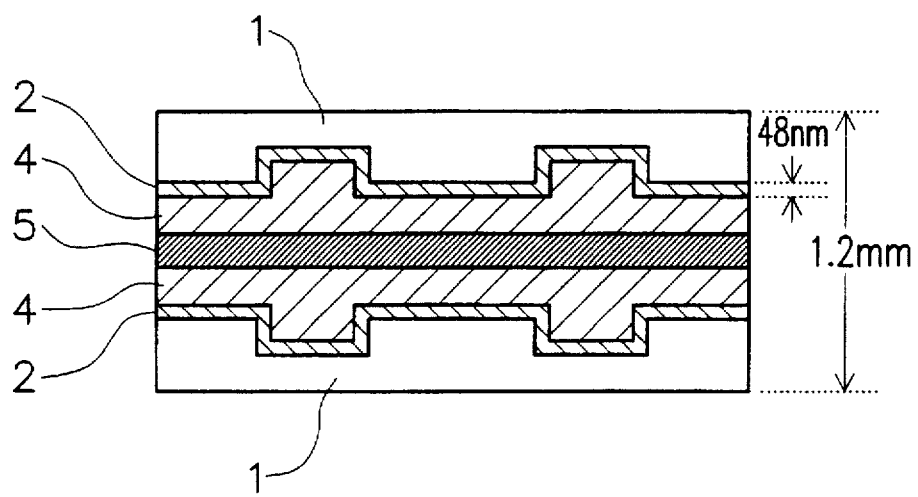
FIG. 9(b) DVD-5
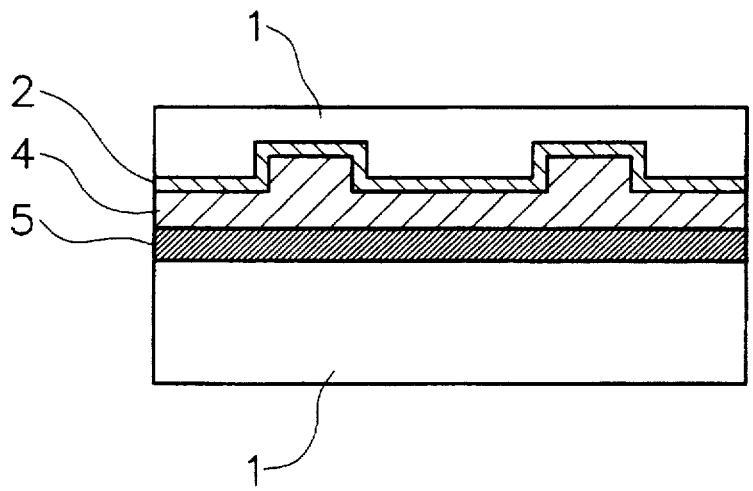

5,785,793

1

PROCESS AND DEVICE FOR BONDING DISCS TO ONE ANOTHER

BACKGROUND OF THE INVENTION

1. Field of the Invention

The invention relates to a process and device for bonding discs on one another, in which there are information recording layers on substrates. The invention relates especially to a process and a bonding device for a digital video disc (or digital versatile disc, such as a compact disk as is used for the storage of computer files and programs or for the digital storage of music) which is formed by bonding two discs to one another, and which hereinafter is called a DVD.

2. Description of the Related Art

Recently, development of a DVD with a storage capacity which is roughly six to eight times as great as in a conventional CD (compact disk) has been promoted as the optical disk system for the next generation. The DVD is formed by bonding two thin disks together, at least one disc of which is provided with an information recording surface. The above described two discs are bonded together using resin which is cured with ultraviolet rays. It is usually performed in such a manner that a resin which can be cured using UV rays is uniformly applied using the spin coating method or the like to flat bonding surfaces, and the adhesive is set by irradiating it with ultraviolet rays, from one or both sides, using a high pressure mercury lamp, a metal halide lamp, or the like.

FIGS. 9(a) and 9(b) show arrangements of DVDs. FIG. 9(a) shows the arrangement of a DVD which can be read from both sides with a storage capacity of 9.4 GB; it is called DVD-10. FIG. 9(b) shows the arrangement of a DVD with a storage capacity of 4.7 GB, called DVD-5. In FIGS. 9(a) & (b), a substrate 1, through which ultraviolet rays and visible radiation are transmitted, is shown which may be formed, for example, of a thermoplastic resin substrate, such as polycarbonate, acrylic, amorphous polyolefin or the like but, generally, a polycarbonate substrate is often used.

In substrate 1, according to the recorded information, concave and convex parts are formed on which an information recording layer 2 is formed which partially transmits ultraviolet rays and which reflects visible rays. In the DVD of the DVD-10 type, two substrates 1 are provided with information recording layers 2. In the DVD of the DVD-5 type, only one of the two substrates 1 is provided with an information recording layer 2. Information recording layer 2 is formed of a film which transmits some of the ultraviolet rays, and which reflects visible rays, for example, an aluminum film, a nickel film, a gold film or the like. But generally, an aluminum film is used.

Furthermore, a protective film layer 4 is located on the information recording layer 2. Protective film layer 4 has ultraviolet radiation transmittance and is formed from a material which has a good adhesive property with respect to the film which forms information recording layer 2. Furthermore, protective film layer 4 can be omitted when there is no quality requirement. Also, a resin 5 which can be cured by ultraviolet rays and which is used as an adhesive for bonding the substrates 1 to each other, is applied uniformly to the bonding surfaces of the two substrates, and cured by irradiation with ultraviolet rays.

The above described two substrates are bonded together in each type of DVD, i.e., both in DVD-10 and DVD-5, such that information recording layer 2 lies on the inside. In the following, a substrate which is provided with the above

2 described information recording layer is called a "disc". The thickness of the DVD provided with protective film layer 4 is roughly 1.2 mm after bonding, as is illustrated in FIG. 9(a). The thickness of the film of information recording layers 2 is roughly 48 nm. The diameter of the DVD is usually 120 mm.

These discs are placed on a treatment carrier and irradiated continually with radiant light which is emitted from a UV radiation source and which contains ultraviolet light. Thus, the resin which can be cured by ultraviolet radiation and which has been applied to the discs is cured.

The aluminum film of the information recording layer 2 of the disc reflects visible rays and transmits ultraviolet rays; however, the reflection factor is high with respect to the ultraviolet rays, and the UV radiation transmittance is usually 1% or less. Furthermore, the UV radiation transmittance of the protective film layer 4 is generally about 20 to 50%, although it also depends on its material and its thickness.

Therefore, the ultraviolet rays which irradiate the discs in the cementing process are, for the most part, attenuated until they reach the resin 5 which can be cured by the UV radiation. To completely cure the resin 5 by uninterrupted irradiation of the disc with ultraviolet rays, therefore, it is necessary to perform the irradiation with ultraviolet rays for a relatively long duration.

If, in this way, uninterrupted irradiation is performed with ultraviolet rays over a long time, the inside of the cage-like body of the irradiation device, the reflector, the treatment carrier and the like are gradually heated up. Therefore, the discs are heated by the secondary IR radiation from the inside of the cage-like body and from the reflector, and by heat conduction from the heated treatment carrier.

The substrates of the DVDs ordinarily deform when the overall temperature rises above 50° C. Therefore, the effect of the above described heating must be reduced. Therefore, in the above described cementing device in which uninterrupted irradiation with ultraviolet rays is performed, it is necessary to arrange a cooling device or the like. Additionally, it is regarded as disadvantageous that not only deformation of the substrates, but also melting or the like of the aluminum film of the information recording layer occurs.

SUMMARY OF THE INVENTION

Therefore, a first object of the invention is to devise a device for bonding disks to one another in which cementing is obtainable within a short time without deforming the UV radiation-transmitting substrates.

A second object of the invention is to devise a process for cementing disks on one another in which, using a low capacity power source, a resin which can be cured by UV radiation can be cured with high efficiency without the aluminum layer of the information recording layer melting, and a device for executing the process.

In a device for cementing discs to one another, in which two discs which are comprised of ultraviolet radiation-transmitting substrates, at least one of which has an information recording layer on it which transmits ultraviolet rays and reflects visible rays, are placed one top of one another after applying an adhesive which is formed of a composition which can be cured by UV radiation, and in which the two discs are bonded to one another as a result of irradiation with radiant light containing UV radiation, the side(s) of the information recording layer(s) of the UV radiation-transmitting substrates being used as adhesive surface(s), the above described objects are achieved according to the invention by the fact that light radiation means which irradiate the above described two discs are placed on top of one another with radiant light which contains ultraviolet radiation generate the radiant light at least once in a flash. Additionally, a wavelength selection means is placed in the optical path between the light radiation means and the discs at a distance to the discs which transmits the ultraviolet rays and which absorbs light in a range of wavelengths which are absorbed by the UV radiation-transmitting substrates of the discs, and a cooling device is provided which admits and discharges cooling air between the light radiation means and the wavelength selection means.

The inventors have found that, in this way, as the ultraviolet radiation source, a light source is used which executes a flash-like emission, for example, a xenon flash lamp, and that by means of one-time or repeated emission(s) of the light source, the discs are irradiated with ultraviolet rays. By using a light source which emits a flash, such as a xenon flash lamp, using a power source with a relative low capacity, a resin curable by UV radiation can be cured in less time as compared to the case for uninterrupted irradiation with ultraviolet rays, heating of the discs due to UV radiation can be further reduced.

The objects of the invention are, furthermore, advantageously achieved by the wavelength selection means being made of plate-like quartz glass.

Still further, the objects of the invention are advantageously achieved by the fact that, in the inventive device described above for cementing discs to one another, the light radiation means is located at a distance of from 20 to 50 mm relative to the two discs being cemented to one another, that the above described light radiation means executes irradiation in accordance with the relationships:

$$E < -7.5 + 5.9 \log \tau$$

and $$88 \leq \tau \leq 1000$$

where E (J/cm$^2$) is the electrical energy per irradiated surface which is supplied to the light radiation means which emits the above described radiant light, and $\tau$ (µs) is the duration of the period in which the current supplied to the light radiation means has ⅓ of its peak value, and where at least the main component of which the information recording layer(s) located on the UV radiation-transmitting substrate(s) is/are made is aluminum.

In terms of the process, the object is achieved, using the above described inventive device for cementing discs to one another, by the fact that in flash irradiation of the above described two discs to be cemented to one another with the UV radiation-containing radiant light and when the adhesive sets as a result of passage of the above described radiant light through the above described information recording layer(s) and by irradiation of the above described adhesive with radiant light in the case in which at least the main component of which the information recording layer(s) located on the UV radiation-transmitting substrate(s) is/are made is aluminum, irradiation of the discs with the radiant light is performed in accordance with the relationships:

$$E < -7.5 + 5.9 \log \tau$$

and $$88 \leq \tau \leq 1000$$

where E (J/cm$^2$) is the electrical energy per irradiated surface which is supplied to the light radiation means which emits the above described radiant light, and $\tau$ (µs) is the duration of the period in which the current supplied to the light radiation means has ⅓ of its peak value.

Using the above described flash emitting light source under various conditions, the inventors have run tests of the cementing of the discs to one another and checked the conditions under which the resin which can be cured using UV rays can be cured with high efficiency without the aluminum layer melting. As a result, it was found that the amount of electrical energy for the light radiation means (for example, for a xenon flash lamp) in which the aluminum layer of the information recording layer of the disc melts is a function of the duration of the current supplied to the light radiation means.

Here, it became apparent that under condition E<-7.5+5.9 log $\tau$, where E (J/cm$^2$) is the electrical energy per irradiated surface which is supplied to the light radiation means which emits the radiant light and where $\tau$ (µs) is the duration of the current supplied to the light radiation means has ⅓ of the peak value of the input current, curing of the resin with UV radiation takes place without melting of the aluminum layer. Hereinafter, $\tau$ (µs) is called ⅓ of the pulse width and the common logarithm is designated log.

Furthermore, it was found that the input electrical energy which is necessary for curing the resin increases if the above described ⅓ pulse width $\tau$ becomes longer, and that for a ⅓ pulse width $\tau$ of greater than 1000 µs, an input electrical energy greater than or equal to 1.5 times the input electrical energy at an optimum ⅓ pulse width is necessary. In addition, it was found that the ⅓ pulse width which can be achieved using circuitry is greater than or equal to 88 µs.

Additionally, the distance between the lamp and disc, and the flash frequency which is necessary to cure the resin by UV radiation were checked. Here, it was found that the frequency required to cure the resin by UV radiation hardly changes at a distance from the lamp center to the irradiated surfaces of the discs of from 20 mm to 50 mm; however, that it increases quickly at distances greater than 50 mm. Due to the physical configuration of the device, it was difficult to set the distance between the lamp center and the irradiated surfaces of the discs at 20 mm or less.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 4(a) & 4(b) are schematic representations of a main circuit of the device shown in FIG. 1 for cementing discs to one another, FIG. 4(a) having two lamps that are series-connected in pairs connected to one power source at a time, and FIG. 4(b) showing one lamp at a time being provided with a power source;

FIG. 4(c) shows a plurality of lamps being series connected to a power source;

FIG. 5 is a graphic depiction of the relation between the melting energy of aluminum and ⅓ of the pulse width;

FIGS. 9(a) & 9(b) schematically show DVD arrangements, FIG. 9(a) showing the arrangement of a DVD which can be read on both sides having a storage capacity of 9.4 GB, and in FIG. 9(b) showing the arrangement of a DVD with a storage capacity of 4.7 GB.

DETAILED DESCRIPTION OF THE PREFERRED EMBODIMENTS

Figure 1A:
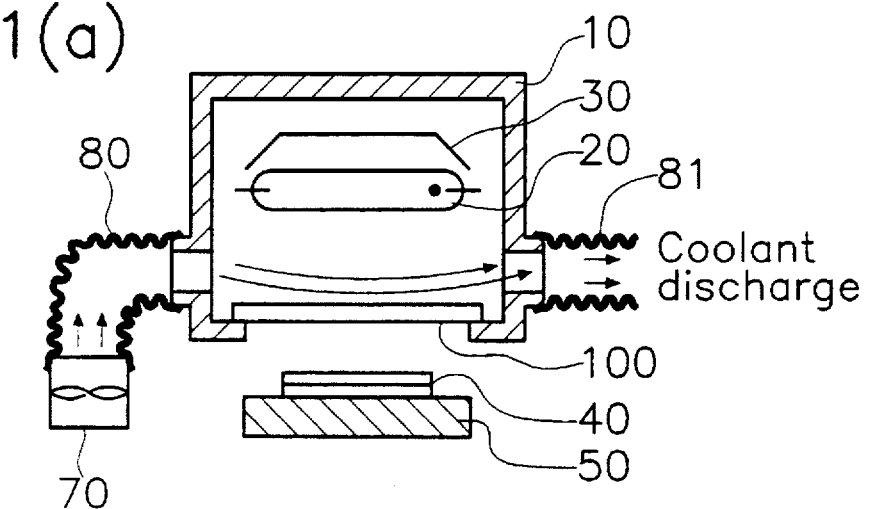
FIGS. 1(a) and (b) schematically show embodiments of arrangements of the devices according to the invention for cementing discs to one another, FIG. 1(a) being a schematic of a device for UV irradiation of one side of the discs and FIG. 1(b) showing a schematic of a device for UV irradiation of both sides of the discs.
Figure 1B:
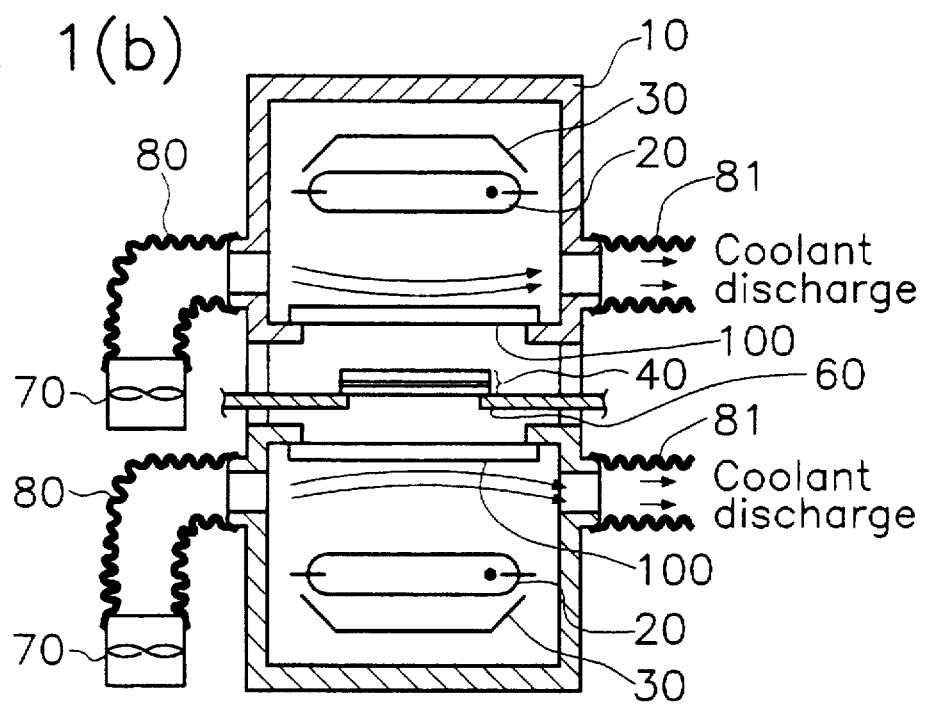

FIGS. 1(a) & (b) schematically show embodiments of the devices according to the invention for cementing discs to one another, FIG. 1(a) showing an example of UV irradiation of one side of the discs, and FIG. 1(b) showing an example of ultraviolet irradiation of both sides of the discs.

In the drawings, a cage-like body 10 contains at least one UV radiation source 20 (two in FIG. 1(b)) which emits radiant UV light in flashes, and which, for example, comprises a xenon flash lamp. A reflector 30 is provided to reflect the radiant light from each UV radiation source 20. Furthermore, a quartz glass sheet 100 is located between each UV radiation source 20 and the discs 40 at a distance to discs 40.

Each quartz glass sheet 100 is cooled by a flow of cooling air which is supplied by a fan 70 through a channel 80 to the quartz glass 100. The cooling air (represented by arrows) passes across the quartz glass sheet 100 in heat exchange relationship thereto and then is discharged from body 10 to the outside by means of a channel 81.

Furthermore, in FIG. 1(a), a treatment carrier 50 is provided for supporting the discs 40 to be cemented together, and in FIG. 1(b) a holding component 60, which is made of a UV radiation-transmitting material, is provided to hold the discs 40, instead.

Figure 2:
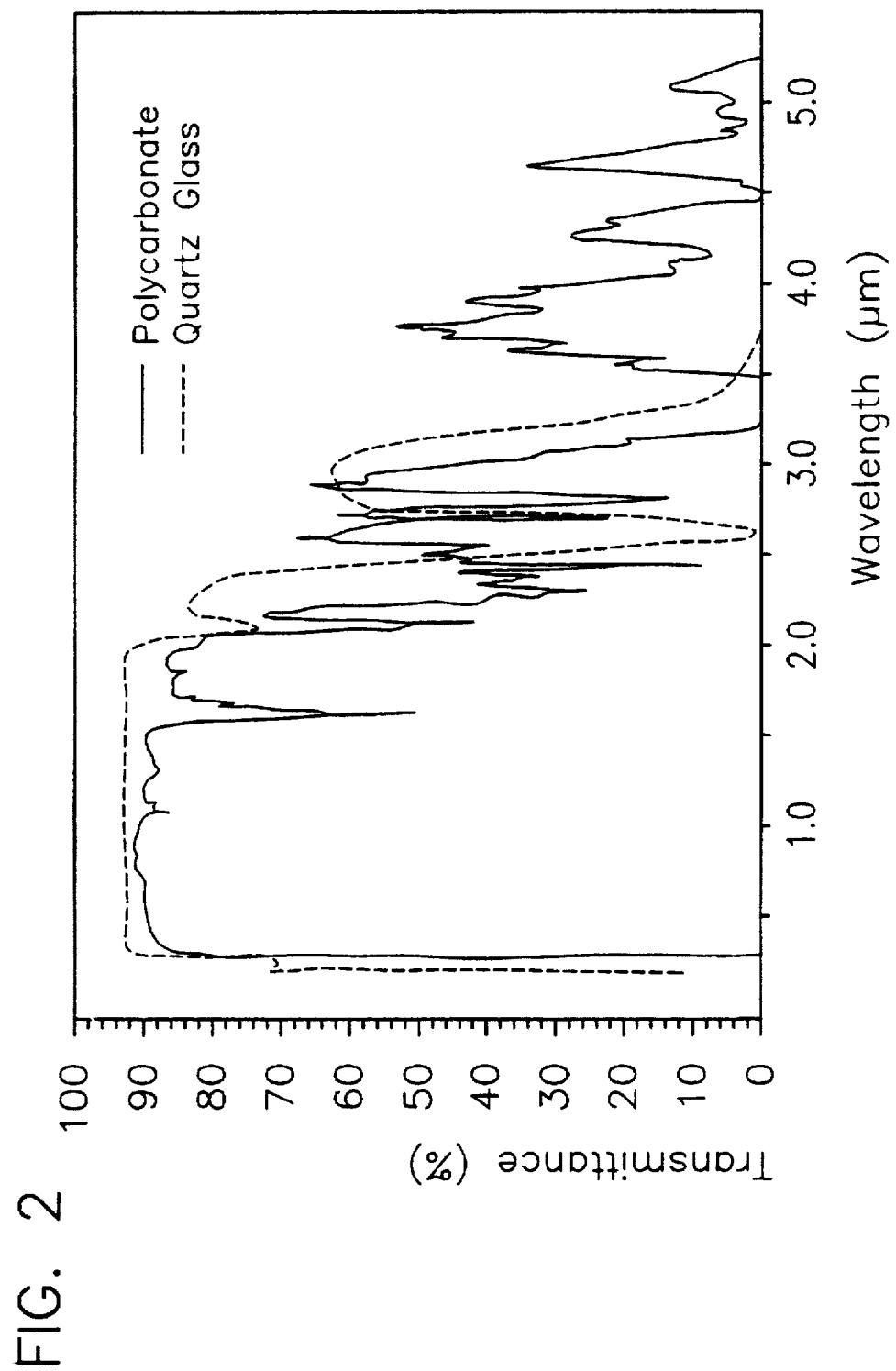
FIG. 2 is a graphic depiction of the light transmission characteristic of polycarbonate and of quartz glass.

FIG. 2 is a graph of the light transmission characteristics of polycarbonate of which the two substrates of discs 40 are made, and of the quartz glass, the x-axis showing the wavelengths (microns) and the y-axis showing the transmission factor (%).

As was described above, UV radiation source 20 comprises a xenon flash lamp which emits radiant light which contains UV rays and this light a peak value of light intensity in the course of repeated flashing in a range of wavelengths and which includes wavelengths longer than 2 to 3 microns.

As is apparent from FIG. 2, in the polycarbonate which forms the substrates, the transmission factor decreases starting from 2 to 3 micron wavelengths. Here, especially light in a range of wavelengths longer than roughly 5 microns is hardly transmitted at all. This means that light in a range of wavelengths longer than roughly 2 to 3 microns is absorbed, and heat is stored in the interior of the disc material.

On the other hand, also in the quartz glass, the transmittance begins to decrease starting from 2 to 3 micron wavelengths. Here, especially light is hardly transmitted at all in a range of wavelengths longer than roughly 4 microns. This means that, here also, light in a wavelength range with wavelengths longer than roughly 2 to 3 microns is absorbed.

Therefore, if quartz glass sheet 100 is located between the UV radiation source 20 and the discs 40 at a distance from the discs 40, quartz glass 100 absorbs the light in the wavelength range of greater than roughly 2 to 3 microns which is contained in the radiant light from the UV radiation source 20. As a result, the light in the above described range which reaches the polycarbonate substrate of discs 40 is reduced. Furthermore, there is no heat conduction from quartz glass 100 to discs 40, because quartz glass sheet 100, with a temperature which rises due to absorption of light in the above described wavelength range, and discs 40 are spaced apart from one another. Thus, it becomes possible to maintain the amount of heat which is stored in discs 40 at a low level. Still further, quartz glass sheet 100 hardly hinders cure cementing of discs 40, since quartz glass sheet 100 transmits up to at least 90% of the UV radiation.

On the other hand, for treatment of several discs 40, the waiting time between cycles is shortened if, to increase the throughput, the transport time for discs 40 is shortened. In this way, by shortening the emission pause between flashes of the xenon flash lamp serving as UV radiation source 20, as a result, the average irradiation energy increases and the temperature of quartz glass sheet 100 increases even more. Here, the possibility cannot be precluded that under certain circumstances the effect of secondary IR radiation from quartz glass sheet 100 will not become negligible.

In this embodiment, however, the quartz glass sheet 100 which is heated by absorption of light in the wavelength range of greater than roughly 2 to 3 microns is cooled. In the above described case that the throughput is to be increased, it becomes possible to reduce the effect of secondary IR radiation from quartz glass sheet 100 onto discs 40.

Figure 3:
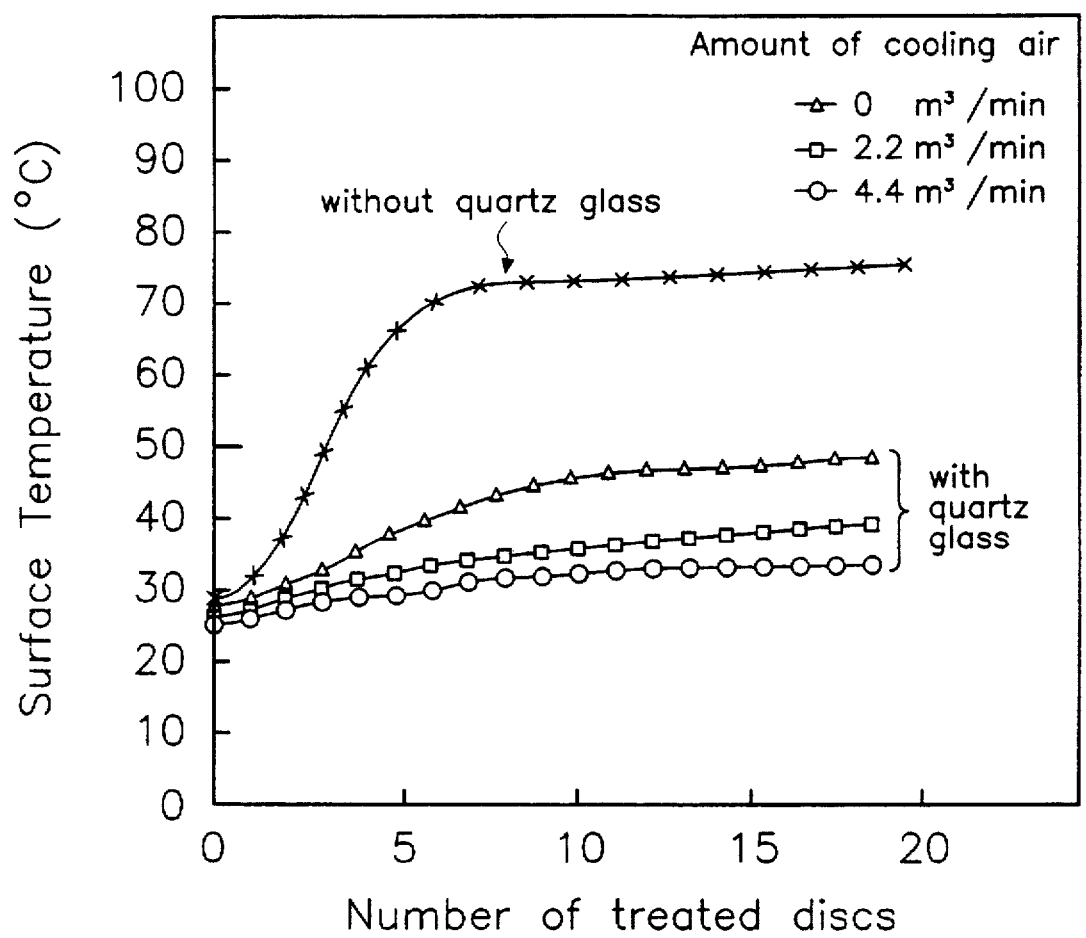
FIG. 3 is a graphic depiction of the surface temperature of the discs for irradiation with radiant light according to the invention.

To confirm the action of the device for cementing discs to one another in this embodiment, in the device for cementing discs to one another with the arrangement shown in FIG. 1(a), the amount of cooling air for quartz glass sheet 100 was changed and the surface temperature of the discs 40 was measured. Furthermore, a measurement was taken in the case in which the quartz glass sheet 100 was not present. The following measurement conditions were also provided:

UV radiation source: four xenon flash lamps
Emission energy in one emission: 400 J at a time
Emission frequency: 30 times per disc
Emission period: 1 time per second
Number of discs to be treated: 18
Temperature measurement position: center region of the disc surface
Temperature measurement means: contact thermometer (during the 30 seconds after emission, measurement and exchange of discs are performed)
Amount of cooling air: 0; 2.2; 4.4 m³/min FIG. 3 shows the results of the above described measurements. In the figure, the x-axis represents the number of discs treated with UV radiation and the y-axis the surface temperature of the discs.

As is apparent from FIG. 3, the surface temperature of discs 40 rises above 50° C. after UV radiation treatment if the number of treated discs 40 exceeds three, in the case in which there is no quartz glass sheet 100 between the UV radiation source 20 and discs 40. The surface temperature of discs 40 rose to roughly 70° C., when more discs 40 were treated. As a result, deformation of discs 40 occurred.

On the other hand, in the case in which quartz glass sheet 100 was located between the UV radiation source 20 and discs 40 and in which the amount of coolant air was 0 m³/min, the surface temperature of the discs was 45° C. when treated discs 40 reached the number 18. On the other hand, the surface temperature of discs 40 in the case of amounts of cooling air of 2.2 m³/min and 4.4 m³/min was 35° C. and 31° C., respectively, when treated discs 40 reached the number 18. In no case did deformation of discs 40 occur. But, it was found that, especially in the case of cooling of quartz glass sheet 100 with the cooling air, the surface temperature of discs 40 is maintained at less than or equal to 40° C., even when the number of discs 40 treated reached 18.

This means that the measure by which the flash-emitting xenon flash lamp is used as UV radiation source 20 and by which there is quartz glass sheet 100 between UV radiation source 20 and discs 40 at a distance from discs 40 prevents the portion of the radiant light which is emitted from this UV radiation source 20 which is in the wavelength range greater than roughly 2 to 3 microns from reaching discs 40, even if the UV radiation source 20 becomes heated. Furthermore, there is no heat conduction from quartz glass sheet 100 to discs 40, since the quartz glass sheet 100 it is spaced apart from the discs 40. In this way, the disadvantage of deformation of discs 40 by heating is eliminated, and it becomes possible to cement discs 40 to one another in a short time.

Therefore, a large disc cooling device for supplying a large amount of cooling air to the discs is no longer needed. Furthermore, there is no longer the danger that the quality of discs 40 will be adversely affected as a result of fine impurities from the cooling air adhering on the surfaces of discs 40. Still further, cure cementing of discs 40 is hardly hindered by the presence of the quartz glass sheet 100 since transmits up to at least 90% of the ultraviolet radiation.

In addition, a situation was assumed in which the waiting time between cycles was shortened to increase the throughput. Here, after completion of the measurement of the surface temperature of the eighteenth disc 40, without replacing discs 40, the xenon flash lamp was used to intermittently emit UV light for an emission period of 3 times per second for a duration of ten minutes, after which the surface temperature of the disc 40 was measured again.

The surface temperature of the disc 40, in spite of these severe conditions, was 45° C. in the case of a cooling air flow of 2.2 m³/min, and was 41° C. in the case of a cooling air flow of 4.4 m³/min. In any case, the surface temperature of disc 40 was kept at less than or equal to 50° C., and deformation of disc 40 was not observed.

This means that, in this embodiment of the device for cementing discs together, by the cooling quartz glass sheet 100 which is heated by absorption of light in the wavelength range of greater than roughly 2 to 3 microns, the effect of secondary IR radiation from quartz glass sheet 100 on discs 40 was essentially eliminated, even in the case in which the waiting time between cycles was shortened due to the shortening of transportation time for the discs 40 to obtain an increase in throughput.

In the above described embodiment, a case was described in which the UV radiation-transmitting substrate was a polycarbonate substrate. However, the invention can also be applied to the case of an acrylic substrate or one formed of an amorphous polyolefin substrate because such substrates have the same transmittance characteristic as the polycarbonate substrate.

In the above described embodiment, plate-like quartz glass was used as the wavelength selection means which transmits ultraviolet rays and which does not allow light in the wavelength range of greater than roughly 2 to 3 microns to be emitted onto the discs. However, the invention is not limited thereto, and for example, plate-like borosilicate glass or the like can be used.

However, the quartz glass especially advantageous since it has good heat resistance, is not subject to significant deterioration due to exposure the ultraviolet rays and has high mechanical strength. Handling thereof as the wavelength selection means which does not allow light in the wavelength range of greater than 2 to 3 microns to be emitted onto the discs is therefore simple.

Furthermore, in the above described embodiment, the measure by which the wavelength selection means absorbs light in the wavelength range of greater than roughly 2 to 3 microns reduces the amount of irradiation of the discs with light in this wavelength range. But, for example, the surface of the glass which transmits the ultraviolet rays and which absorbs the IR rays in the above described wavelength range can be provided with a multilayer dielectric film and can partially reflect the light in the above described wavelength range.

FIGS. 4(a)–(d) schematically show arrangements for the lamp power sources used in the above-described embodiments. In FIGS. 4(a)–(c), a circuit is shown having a DC power source 31, a capacitor C, and an inductance L which is the inductance of a line wire between the lamp power source 31 and a lamp and on the inner inductance of capacitor C and which is used to set the pulse width and the like. Furthermore, reference letters FL are used to designate a xenon flash lamp which is hereinafter called "lamp". In FIG. 4(a), two pairs of series-connected lamps FL are each connected to a respective lamp power source 31 and a total of four lamps are caused to emit. Furthermore, as is shown in FIG. 4(b), instead of pairs of lamps, a single lamp FL can be with each of the multiple power sources and the lamps caused to emit. Still further, four series-connected lamps FL can be connected to a single power source 31, as is represented in FIG. 4(c).

Additionally, in the case of using several lamps as UV radiation source 20, the curing effectiveness is increased more dramatically if several lamps are caused to emit in synchronism. Therefore, several lamps are usually synchronized by means of a trigger circuit (not shown in the drawing) for producing emission of all of the lamps at the same time.

The UV radiation source 20 of the device shown in FIG. 1(a) for cementing discs to one another was caused to emit by the lamp power source shown in FIG. 4(a) and the following was checked:

(1) Input electrical energy for the lamp for which the aluminum film does not melt.

It was checked the relation between ⅓ of the pulse width and the input electrical energy for the lamp at which the aluminum film which comprises the information recording layer of disc 40 melts. In this test, two pairs of UV radiation sources 20 (four lamps for one pair of UV radiation sources) were located on one side of the discs. The four lamps were flashed at the same time, and irradiation was performed from one side of the discs, the distance between the lamp center and treatment carrier 50 having been set to 45 mm and the distance between the surfaces on which discs 40 are placed and the quartz glass having been set to 25 mm.

The above described ⅓ pulse width was changed by changes of the value of inductance L of the lamp power sources 31 and of the value of capacitor C. Furthermore, the input electrical energy for the lamp was changed by changes of the value of capacitor C and of the value of the charging voltage.

To irradiate a disc with a diameter of 120 mm with a uniform illumination intensity, an arc length of a lamp of at least 140 mm is necessary. To series connect and operate two lamps with an arc length of at least 140 mm, the maximum operating voltage (maximum voltage with which the lamps do not pass into a continuous operating state) is 2000 V per lamp pair. The voltage of power source 31 in FIG. 4 was, therefore, set to 1800 V with consideration of tolerance. Furthermore, the capacitance of capacitor C was changed at the proper time in a range from 123 μf to 600 μf, in which the irradiation energy required to cure the UV radiation curable resin can be supplied.

Figure 6:
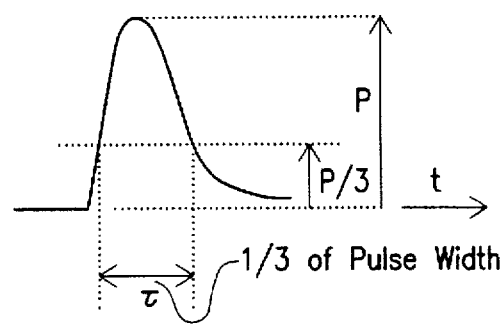
FIG. 6 schematically depicts ⅓ of the pulse width.

FIG. 5 shows a plot of the relationship between ⅓ of the pulse width and the input electrical energy for the lamp per irradiated surface at which the aluminum film melts. An input electrical energy Em for the lamp per irradiated surface S at which the surface temperature of the aluminum film of the disc reaches its melting point, i.e., 660° C., by flash irradiation was plotted. FIG. 6 is a graph of the relationship between the pulse shape of the input current for the lamp and ⅓ of the pulse width.

In FIG. 5, the x axis shows ⅓ of the pulse width τ which is shown with a common log scale, and the y axis the input electrical energy J/S (J/cm$^2$) for the lamp per irradiated surface, the input electrical energy for the lamp being designated J (joule) and the irradiated surface S (cm$^2$).

In this example, the irradiated surface was roughly 113 cm$^2$ (surface area of the disc 6 cm×6 cm×τ). The values of the y axis in FIG. 5 were computed by dividing the total input electrical energy for the four lamps by 113 cm$^2$.

By means of line A, FIG. 5 shows the input electrical energy E (J/cm$^2$) for the lamp per irradiated surface at which the aluminum film melts. The aluminum film melts when energy is supplied in an amount which exceeds line A.

In addition, in FIG. 5, together with the line A, using broken line B, the upper boundary of ⅓ of the pulse width described below was found, and using broken line C, the lower boundary thereof was shown. The region surrounded by line A and broken lines B and C represents a usable range.

The above described test showed that input electrical energy Em (J/cm$^2$) for the lamp per irradiated surface at which the aluminum film melts, and ⅓ of pulse width τ (microseconds) are represented by the following formula (1) in which log is the common logarithm:

$$Em=-7.5+5.9 \log \tau \tag{1}$$

The input electrical energy E (J/cm$^2$) for the lamp per irradiated surface must therefore satisfy the condition according to the following equation:

$$E<-7.5+5.9 \log \tau \tag{2}$$

The above described equations must, furthermore, also be satisfied for each side in the case of simultaneous irradiation of both sides of the discs.

The lamp is usually no longer operated when the voltage applied to the lamp reaches a value of 40% of the maximum operating voltage.

The value of the input electrical energy for the lamp which corresponds to the irradiation energy of the lamp is computed by following formula (3) in which C is the capacitance of the capacitor in FIG. 4 and V is the lamp voltage:

$$E=½×C×v^2 \tag{3}$$

The minimum input electrical energy for the lamp at which the lamp is no longer operated is therefore 31.9 (J), when the value of capacitor C is, for example 123 μf and the voltage V of the DC source 31 is 1800 V, as was described above. This means that luminous operation of the lamp is not produced unless electrical energy of at least 30 J per pair of power sources is supplied.

(2) Practicable range of ⅓ of the pulse width.

Here, ⅓ of the pulse width and the total energy (total energy being equal to irradiation frequency x input electrical energy the lamp/irradiated surface) which is necessary for curing the resin were checked.

The above described ⅓ pulse width was changed in the same manner as in (1), by changes of the values of inductance L of the lamp power source shown in FIG. 4 and of capacitor C. Furthermore, the input electrical energy for the lamp was changed by changes of the value of capacitor C shown in FIG. 4, the charging voltage and the irradiation frequency.

Figure 7:
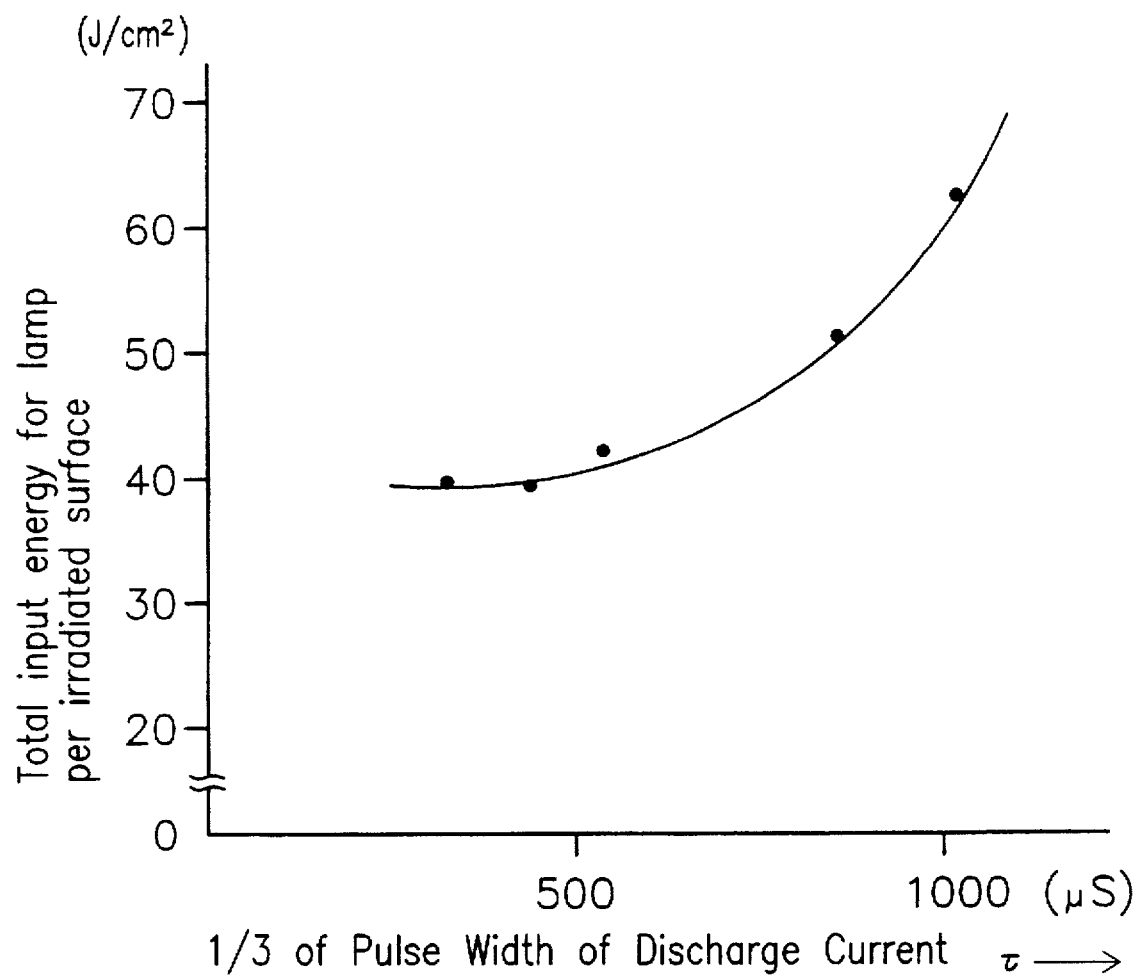
FIG. 7 is a graphic depiction of the relation between the total energy required for curing and ⅓ of the pulse width.

In this case, the result shown in FIG. 7 was obtained. As is shown in the figure, the total energy required to cure the UV curable resin increases the more, the longer the pulse width becomes. It was found that, at ⅓ of the pulse width τ of 1000 μs, energy which is 1.5 times as much as at 500 μs is required.

At a ⅓ of the pulse width of 1000 μs, it is therefore necessary that the repetition frequency of irradiation be increased to supply more energy to the discs. At the same input electrical energy per flash, the throughput drops. Furthermore, if the frequency of repetition of irradiation is accelerated to prevent a drop of throughput, the power necessary for treatment per disk increases. This means that the efficiency of treatment decreases if ⅓ of pulse width τ is not set to less than or equal to 1000 μs.

Next, a pulse width which can be accomplished using circuitry is determined. The minimum pulse width in the case in which there is no floating inductance can be derived from the differential equation shown below in (4) for a known xenon flash lamp.

$$(1/C)\int i dt + KVi = V_o \tag{4}$$

In the above described equation, C is the capacitor capacitance, K is the proportional constant which is determined by the lamp shape and the like, i(A) is the current, and $V_o$ is the charging voltage of the capacitor. Based on the above described equation (4), the minimum ⅓ of the pulse width τ of the discharge current is computed by the following formula:

$$\tau=0.73×C×K^2/V \tag{5}$$

If, in this example, for the above described voltage V, a voltage of 1800 V of one pair of power sources to which the two lamps, are series connected is used, a minimum value of the capacitor of 123 μf per lamp pair is used for C and a lamp value of 42 is used for K, the result is the following:

$$\tau=88 \text{ (μs)}$$

This means that irradiation can be performed only with a pulse width of at least 88 μs.

As was described above, the following must be satisfied with respect to ⅓ of the pulse width τ:

$$88 \text{ μs} \leq \tau \leq 1000 \text{ μs}$$

FIG. 5, as was described above, shows the above described region using broken lines B and C.

(3) Distance between the lamp and discs during irradiation.

In the device shown in FIG. 1(a), the flash frequency of the lamp necessary to cure the UV curable resin was checked by changes of the distance d between the UV radiation source 20 and discs 40.

Figure 8:
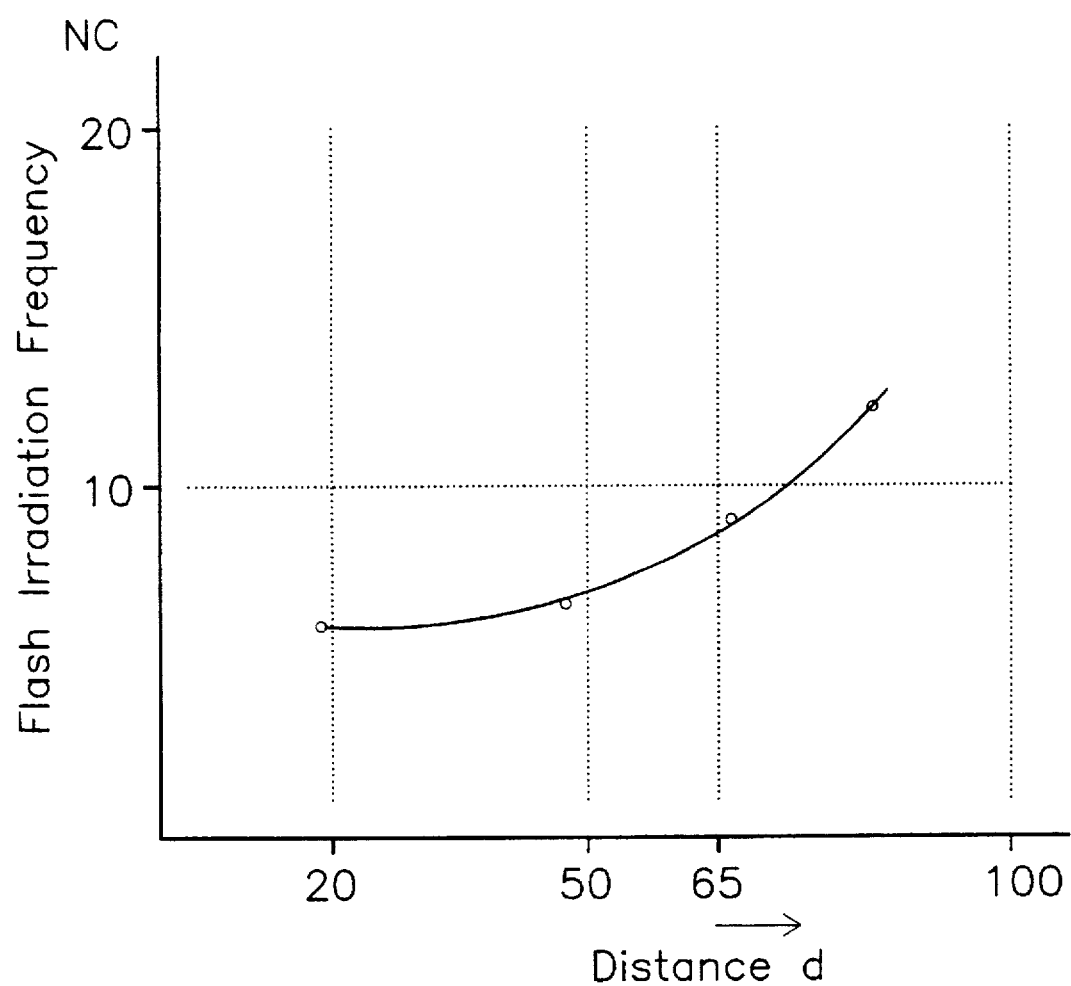
FIG. 8 is a graphic depiction of the relation between the distance between the lamp center and the surface of the disc carrier and the flash frequency necessary for curing.

FIG. 8 shows the result, with the x axis plotting distance d between the lamp center of UV radiation source 20 and the surface of the treatment carrier for discs 40 and the y axis indicating the lamp flashing frequency. In the figure, the flashing frequency is plotted for when the input electrical energy E for the lamp per irradiated surface is 2.84 J/cm$^2$ and ⅓ of the pulse width is 250 μs.

As is apparent from the drawing, at a distance between the lamp center and the surface of the discs of from 20 to 50 mm, the flash frequency of the lamp necessary to cure the resin hardly changes. The flash frequency of the lamp necessary to cure the UV curable resin, however, increases rapidly at distances greater than 50 mm. This indicated that it is desirable that the distance between the lamp center and the surfaces of the discs be at most 50 mm.

With consideration of the tube diameter of lamp 20, the thickness of treatment carrier 50, the thickness of quartz glass sheet 100 and the like with respect to construction, it is difficult to set the distance between the lamp center and the surfaces of the discs at 20 mm or less. Therefore, the lower boundary of the distance d between lamp 20 and discs 40 is roughly 20 mm.

In (1) through (3) above, a device was examined which irradiates the discs from only one side, as in FIG. 1(a). But, it can be expected that the irradiation conditions are also the same in the case of irradiation of the discs from the two sides, as in FIG. 1(b), in which the two sides are provided with information recording layers such as DVD-10 or the like.

Action of the Invention

In the device according to the invention for cementing discs to one another, of the radiant light which is emitted when the light emission means has reached a heated state, the light in the wavelength range of greater than roughly 2 to 3 microns is absorbed or reflected by the wavelength selection means, and thus, this light is prevented from reaching the above described articles to be treated. This eliminates the disadvantage that the articles to be treated, that is, the two discs which are placed on top of one another, are deformed by heating and the discs are able to be cemented to one another within a short time by cure cementing by means of the adhesive of a composition which can be cured with UV radiation. The above described wavelength selection means, furthermore, transmits the ultraviolet rays, and therefore, does not appreciably hinder cure cementing of the discs.

Therefore, a large cooling device for supplying a large amount of cooling air to the discs is no longer needed. Furthermore, there is no longer the danger that the quality of the discs will be adversely affected as a result of adhesion of fine impurities from the cooling air on the surfaces of the discs.

Furthermore, in the case in which the waiting time between cycles is shortened to increase the throughput by shortening the transport time for the discs, the effect of secondary IR radiation from the quartz glass onto the discs was essentially eliminated. The same is true also, when the pause of emission of the light radiation means is shortened and as a result the average irradiation energy which is supplied to the wavelength selection means is increased.

In addition, simple handling of the wavelength selection means was achieved by the measure by which polycarbonate substrates, which are used in general, are used as the UV radiation-transmitting substrates of the discs and by which the wavelength selection means is made of plate-like quartz glass, which has the advantages of good thermal resistance, low deterioration by ultraviolet rays and high mechanical strength.

Furthermore, according to the invention, the input electrical energy for the light radiation means per irradiated surface is set such that the condition according to equation (2), which is represented using the duration τ (μs), is satisfied if the current supplied to the light radiation means has ⅓ of its peak value. In this way, two discs can be cemented to one another with relatively low input electrical energy and with high efficiency without the aluminum of the information recording film melting, or without thermal deformation of the discs occurring.

It is to be understood that although preferred embodiments of the invention have been described, various other embodiments and variations may occur to those skilled in the art. Any such other embodiments and variations which fall within the scope and spirit of the present invention are intended to be covered by the following claims.

What we claim is:

1. Device for bonding together two disc substrates, each of which has a UV transmissive base, at least one disc substrate of which has, on the UV transmissive base thereof, an information recording layer which transmits ultraviolet rays and reflects visible rays, with the disc substrates on top of one another with a bonding agent therebetween that is made of a UV curable composition, the information recording layer of said at least one of the disc substrates facing the other of the disc substrates, comprising a light irradiation means for irradiating the two disc substrates with light which contains ultraviolet rays with one or more flashes;

a wavelength selection means for transmitting ultraviolet rays and absorbing light in a range of wavelengths which are absorbed by the disc substrates, said wavelength selection means being disposed in an optical path between the light irradiation means from the disc substrates separating the light irradiation means from the disc substrates;

and a cooling means which supplies and discharges cooling air between the light radiation means and the wavelength selection means.

2. Device for bonding together two disc substrates according to claim 1, wherein the wavelength selection means comprises a quartz glass plate.

3. Device for bonding together two disc substrates according to claim 1, wherein the light irradiation means is located at a distance from 20 to 50 mm from the two disc substrates; wherein the light irradiation means emits radiant light in accordance with the relationships:

$$E < -7.5 + 5.9 \log \tau \text{ and } 88 \leq \tau \leq 1000$$

where E (J/cm$^2$) is the electrical energy per irradiated surface which is supplied to the light irradiation means which emits the radiant light, and where τ (μs) is the duration in which current supplied to the light irradiation means has ⅓ of its peak value, and where log is the common logarithm;

and wherein at least a main component of which the information recording layer on the at least one of the disc substrates is made is aluminum.

4. Device for bonding together two disc substrates according to claim 1, wherein the light irradiation means comprises a xenon flash lamp.

5. Process for bonding together two disc substrates, each of which has a UV transmissive base, on top of one another with a bonding agent therebetween that is made of a composition which can be cured with UV radiation, at least one of facing sides of disc substrates having an information recording layer thereon which transmits ultraviolet rays and reflects visible rays and which has said bonding agent on a surface thereof, comprising the steps of:

emitting radiant light which contains ultraviolet radiation toward the disc substrates at least once in a flash using a light irradiation means;

absorbing light in a range of wavelengths which are absorbed by the the disc substrates from the radiant light emitted using wavelength selection means disposed in an optical path between the light irradiation means and the disc substrates at a distance from the disc substrates, and transmitting ultraviolet rays of said radiant light on to said disc substrates;

directing cooling air between the light irradiation means and the wavelength selection;

setting the bonding agent as a result of passage of the ultraviolet rays of the radiant light through the information recording layer and by irradiation of the bonding agent with the ultraviolet rays of the radiant light;

wherein irradiation of the disc substrates with radiant light is performed in accordance with the relationships:

$$E < -7.5 + 5.9 \log \tau \text{ and } 88 \leq \tau \leq 1000$$

where E (J/cm$^2$) is the electrical energy per irradiated surface which is supplied to the light radiation means which emits the radiant light, and where $\tau$ (μs) is the duration in which current supplied to the light irradiation means has ⅓ of its peak value, and where log is the common logarithm; and wherein at least a main component of which the information recording layer on the at least one of the disc substrates is made is aluminum.

* * * * *